United States Patent
Jung et al.

(10) Patent No.: US 11,625,195 B2
(45) Date of Patent: Apr. 11, 2023

(54) MEMORY SYSTEM AND OPERATING METHOD OF MEMORY SYSTEM STORING DOORBELL INFORMATION IN THE BUFFER MEMORY

(71) Applicant: SK hynix Inc., Gyeonggi-do (KR)

(72) Inventors: In Ho Jung, Gyeonggi-do (KR); Ji Woon Yang, Gyeonggi-do (KR); Gi Jo Jeong, Gyeonggi-do (KR); Seung Duk Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/372,053

(22) Filed: Jul. 9, 2021

(65) Prior Publication Data
US 2022/0261185 A1 Aug. 18, 2022

(30) Foreign Application Priority Data
Feb. 18, 2021 (KR) .......................... 10-2021-0021569

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0656* (2013.01); *G06F 3/0679* (2013.01)

(58) Field of Classification Search
CPC .... G06F 3/0659; G06F 3/0604; G06F 3/0631; G06F 3/0656; G06F 3/0679
See application file for complete search history.

(56) References Cited

U.S. PATENT DOCUMENTS

| | | | | |
|---|---|---|---|---|
| 6,523,060 B1 * | 2/2003 | Kao | ........................ | G06F 5/06 370/413 |
| 2003/0145012 A1 * | 7/2003 | Kurth | .................. | G06F 16/9024 |
| 2004/0019882 A1 * | 1/2004 | Haydt | .................... | G06F 9/546 717/151 |
| 2012/0331083 A1 * | 12/2012 | Li | .......................... | G06F 13/28 709/212 |
| 2022/0229585 A1 * | 7/2022 | Kang | .................... | G06F 3/0619 |
| 2022/0255872 A1 * | 8/2022 | Srinivasan | ............. | H04L 47/11 |

FOREIGN PATENT DOCUMENTS

KR 10-2018-0045103 A 5/2018
KR 10-2019-0064083 A 6/2019

OTHER PUBLICATIONS

NVM ExpressTM Base Specification, NVM Express, Revision 1.4 (Year: 2019).*

* cited by examiner

*Primary Examiner* — Ramon A. Mercado
(74) *Attorney, Agent, or Firm* — IP & T Group LLP

(57) ABSTRACT

Embodiments of the present disclosure relate to a memory system and an operating method of the memory system. According to embodiments of the present disclosure, a memory system may include a buffer memory for storing tail doorbell information for N submission queues capable of storing a command fetched from the host or head doorbell information for N completion queues capable of storing an execution result of the command fetched from the host.

7 Claims, 11 Drawing Sheets

MEMORY SYSTEM AND OPERATING METHOD OF MEMORY SYSTEM STORING DOORBELL INFORMATION IN THE BUFFER MEMORY

CROSS-REFERENCE TO RELATED APPLICATION

The present application claims priority under 35 U.S.C. 119(a) to Korean patent application number 10-2021-0021569 filed on Feb. 18, 2021, which is incorporated herein by reference in its entirety.

BACKGROUND

1. Technical Field

Embodiments of the present disclosure relate to a memory system and an operating method of the memory system.

2. Related Art

A memory system includes a data storage device that stores data on the basis of a request from a host, such as a computer, servers, a smartphone, a tablet PC, or other electronic devices. Examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system also includes a memory controller for controlling a memory device. The memory controller receives a command from the host and, on the basis of the received command, executes the command or control read/write/erase operations on one or memory devices in the memory system. The memory controller is used to execute firmware operations for performing a logical operation for controlling such operations.

Moreover, a memory system communicates with a host using an interface based on a plurality of command queues. In this case, the command queues used for communication between the memory system and the host may be a submission queue in which a command to be executed by the memory system is stored or a completion queue in which an execution result of a corresponding command is stored.

SUMMARY

Embodiments of the present disclosure may provide a memory system and an operating method of the memory system capable of efficiently managing resources for storing doorbell information.

In addition, embodiments of the present disclosure may provide a memory system and an operating method of the memory system capable of preventing an issue of limiting the number of available submission queues and completion queues.

In one aspect, embodiments of the present disclosure may provide a memory system capable of performing a preset command queue-based interface operation with a host.

The memory system may include a buffer memory for storing 1) tail doorbell information for N (where N is a natural number) submission queues capable of storing a command fetched from the host or 2) head doorbell information for N completion queues capable of storing an execution result of the command.

In another aspect, embodiments of the present disclosure may provide an operating method of a memory system capable of performing a preset command queue-based interface operation with a host.

The operating method of the memory system may include receiving, from the host, an update request for 1) tail doorbell information for one of N (where N is a natural number) submission queues capable of storing a command fetched from the host or 2) head doorbell information for one of N completion queues capable of storing an execution result of the command.

In addition, the operating method of the memory system may include searching for, in a buffer memory which stores the tail doorbell information or the head doorbell information, an address in which the tail doorbell information or the head doorbell information is stored in the buffer memory.

Further, operating method of the memory system may include updating the tail doorbell information or the head doorbell information stored in the buffer memory.

In another aspect, embodiments of the present disclosure may provide a system including 1) a memory system including a memory device and 2) a host including a plurality of queues associated with at least one command for the memory device.

The memory system may further include a buffer memory configured to store doorbell information with submission and completion of the command.

The memory system may further include one or more control registers configured to store information regarding a position of the buffer memory in which the doorbell information is stored.

According to embodiments of the present disclosure, it is possible to efficiently manage resources for storing doorbell information, and prevent an issue in which the number of available submission queues and completion queues is limited.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
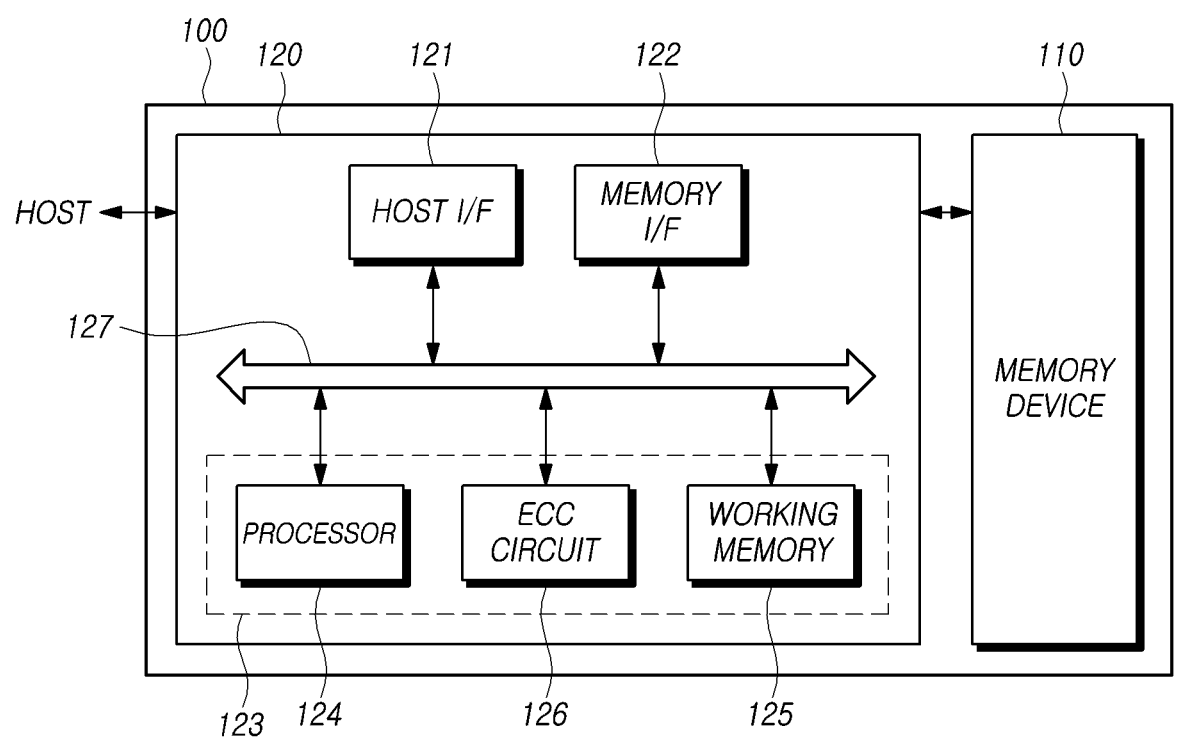
FIG. 1 is a schematic diagram illustrating a configuration of a memory system according to an embodiment of the disclosed technology.

FIG. 1 is a diagram illustrating the schematic configuration of a memory system 100 according to an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erase operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120, and access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erase operation, and the like. During the program operation, the memory device 110 may write data in the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations that are performed on the memory device 110. The background operations may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a host interface (I/F) 121, a memory interface (I/F) 122, and a control circuit 123.

The host interface (I/F) 121 may be configured to provide an interface for communication with the host.

When receiving a command from the host HOST, the control circuit 123 may receive the command through the host interface (I/F) 121 and may perform an operation of processing the received command.

The memory interface (I/F) 122 may be directly or indirectly connected to the memory device 110 to provide an interface for communication with the memory device 110. That is, the memory interface (I/F) 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface (I/F) 121. The processor 124 may communicate with the memory device 110 through the memory interface (I/F) 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host and to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. That is, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 (i.e., host interface 121, memory interface 122, processor 124, working memory 125, and error detection/correction circuit 126) of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
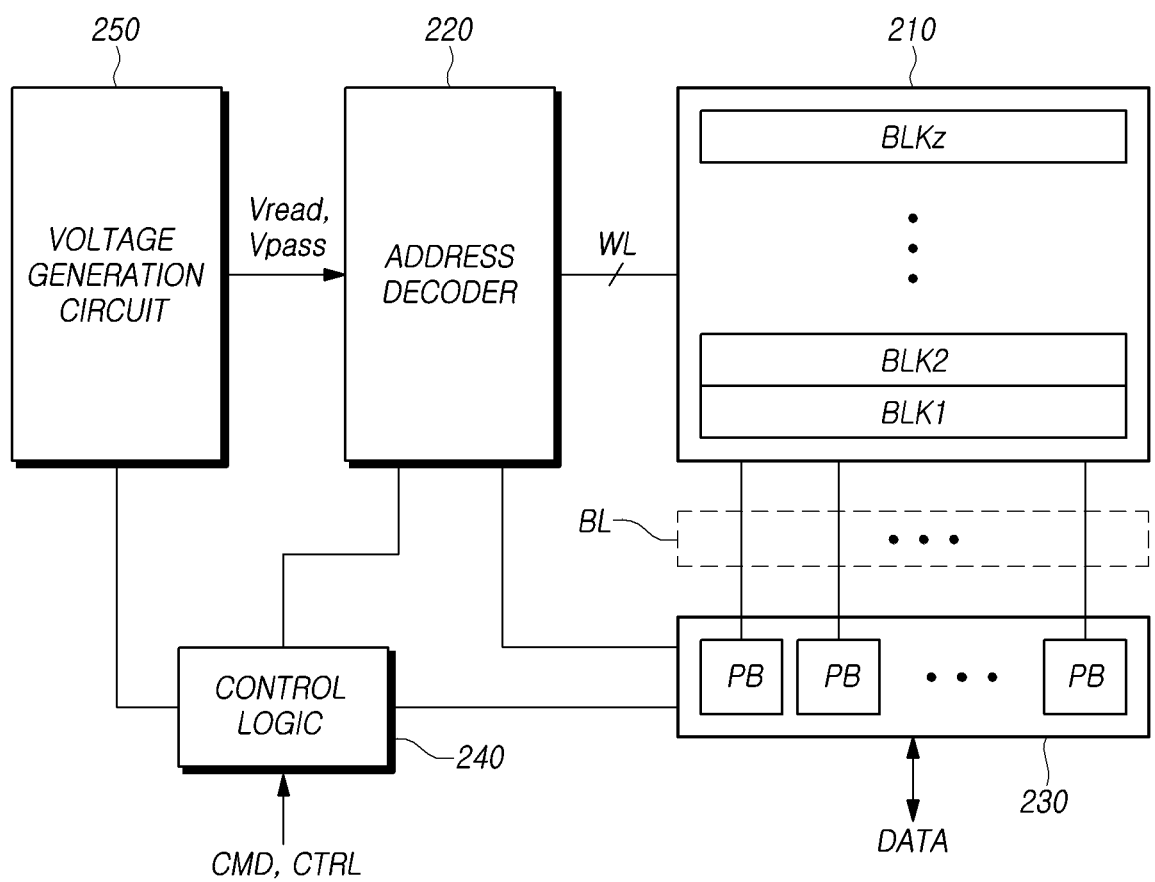
FIG. 2 is a block diagram schematically illustrating a memory device according to an embodiment of the disclosed technology.

FIG. 2 is a block diagram schematically illustrating a memory device 110 according to an embodiment of the disclosed technology.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number larger than or equal to 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged as a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. In another example, each of the multiple memory cells included in the memory cell array 210 may be a multi-level cell (MLC) configured to store two bits of data per memory cell. In another example, each of the multiple memory cells included in the memory cell array 210 may be a triple-level cell (TLC) configured to store three bits of data per memory cell. In another example, each of the multiple memory cells included in the memory cell array 210 may be a quad-level cell (QLC) configured to store four bits of data per memory cell. In another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer (not shown) inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation on the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. In another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erase operation may be performed memory block by memory block.

Figure 3:
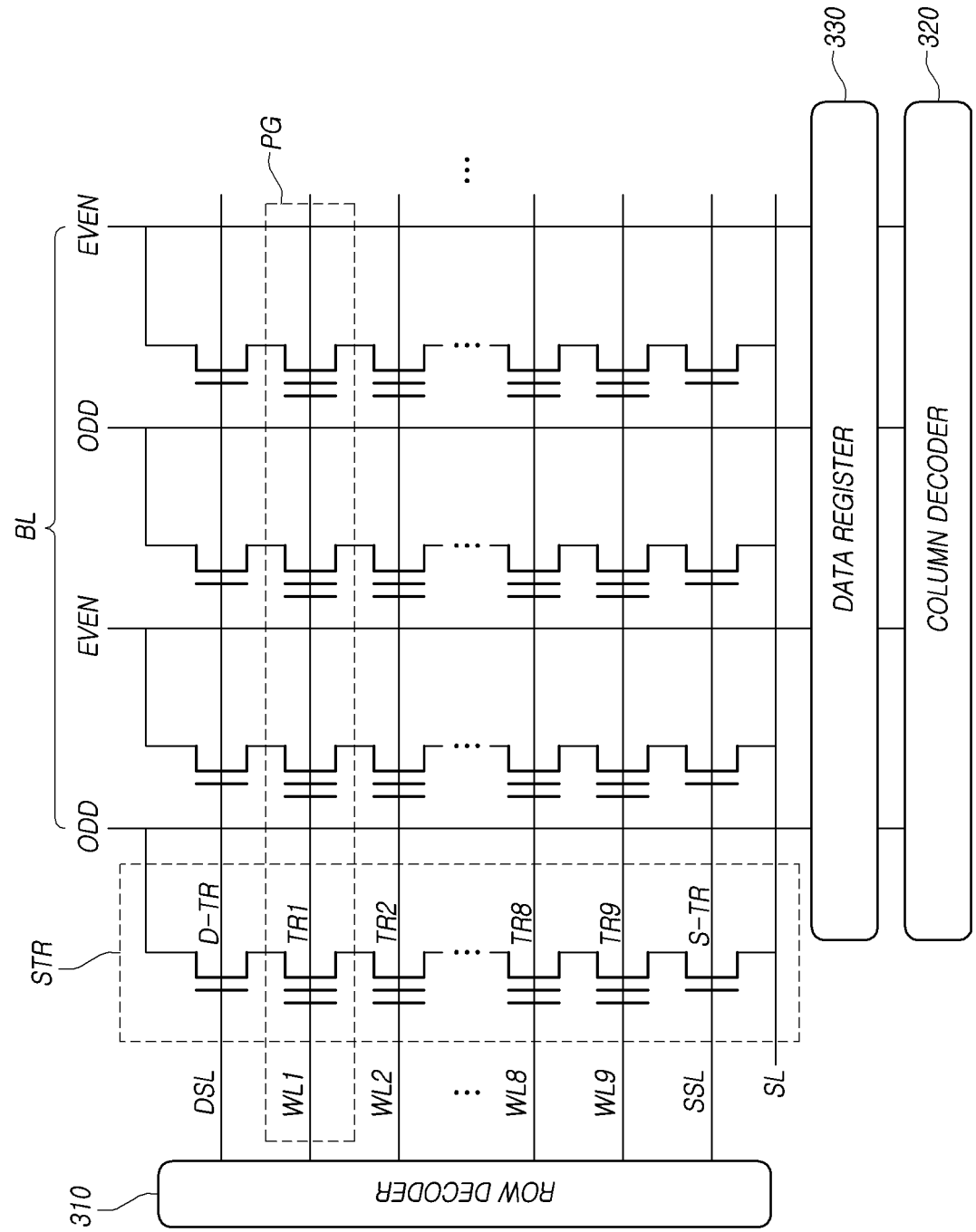
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 according to an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied erase voltage can remove electrical charges from the floating gates FG of the selected memory cells.

Figure 4:
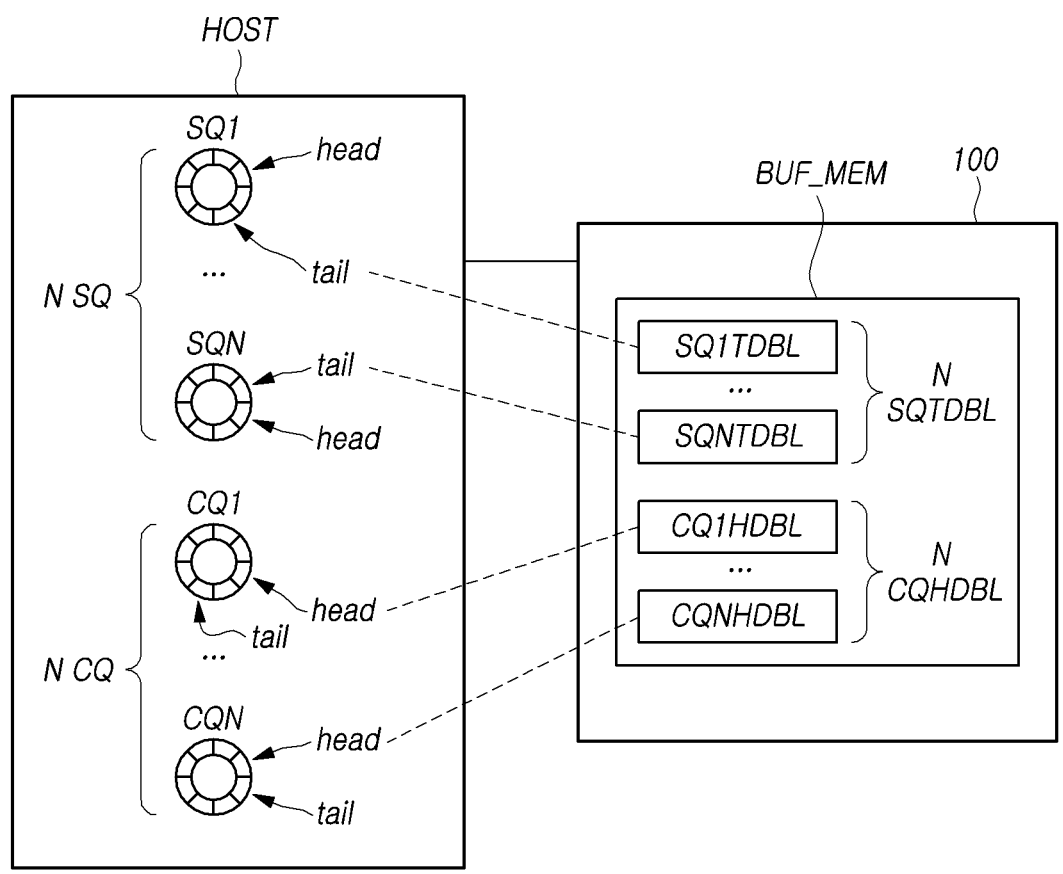
FIG. 4 is a diagram illustrating a schematic structure of a memory system and a host according to embodiments of the present disclosure.

FIG. 4 is a diagram illustrating a schematic structure of a memory system 100 and a host according to embodiments of the present disclosure.

A memory system 100 may perform a preset command queue-based interface operation with a host HOST. In this case, the command queue-based interface which can be used for communication between the memory system 100 and a host HOST may be Serial ATA (SATA), Serial Attached SCSI (SAS), and Non-Volatile Memory Express (NVMe).

The memory system 100 may include a buffer memory BUF_MEM capable of storing data. For example, the buffer memory BUF_MEM may be the working memory 125 shown in FIG. 1. In another example, the buffer memory BUF_MEM may be a separate volatile memory (e.g. SRAM, DRAM, SDRAM) added to the memory controller 120 separately from the working memory 125.

The buffer memory BUF_MEM may store tail doorbell information SQ1TDBL~SQNTDBL for N (where N is a natural number) submission queues SQ and head doorbell information CQ1HDBL~CQNHDBL for N completion queues CQ.

To this end, the memory system 100 may allocate a partial area of the buffer memory BUF_MEM as an area capable of storing the tail doorbell information and the head doorbell information.

In this case, the operation of allocating a partial area of the buffer memory BUF_MEM as the area capable of storing the tail doorbell information and the head doorbell information may be executed by, for example, the processor 124 shown in FIG. 1 or by a separate buffer allocation unit (BAU) included in the memory system 100 as another example. In addition, the size of the area capable of storing the tail doorbell information and the head doorbell information may be a multiple of a set unit (e.g. 4 KB).

The submission queue SQ is a queue capable of storing commands that the memory system 100 fetches from the host HOST. After the host HOST stores the command in the submission queue SQ, the memory system 100 may fetch the command from the submission queue SQ and execute the command.

The completion queue CQ is a queue capable of storing the execution result of a command fetched by the memory system 100 from the host HOST. When the memory system 100 stores the execution result of the command in the completion queue CQ, the host HOST may perform a subsequent operation according to the execution result of the command.

In embodiments of the present disclosure, the host HOST may manage N submission queues SQ1 to SQN and N completion queues CQ1 to CQN. In this case, the N submission queues SQ1 to SQN and the N completion queues CQ1 to CQN may be stored in a memory on the host HOST.

In this case, the value of N may be determined according to various criteria. For example, the value of N may be arbitrarily designated by the host HOST, or may be determined according to the capability of the memory system 100 (e.g. the number of cores which can be executed at the same time).

One of the N submission queues SQ1 to SQN and one of the N completion queues CQ1 to CQN may constitute one queue pair. The execution result of the command stored in one submission queue SQ may be stored in a completion queue CQ constituting a queue pair with the corresponding submission queue SQ. N queue pairs may be constituted based on N submission queues SQ1 to SQN and N completion queues CQ1 to CQN, and in this case, there may be a difference in priority for accessing each of the N queue pairs by the memory system 100.

The N submission queues SQ1 to SQN and the N completion queues CQ1 to CQN may be implemented as a circular queue or a linear queue, for example. In FIG. 4, a case in which N submission queues SQ1 to SQN and N completion queues CQ1 to CQN are circular queues is described as an example.

Each submission queue SQ and each completion queue CQ may have a head and a tail. The head or tail of the submission queue SQ and the completion queue CQ may be changed according to input/output generated in the submission queue SQ and the completion queue CQ. The head and tail of each submission queue SQ and each completion queue CQ may be a pointer indicating a location of a specific element in the corresponding queue.

The tail doorbell information for the submission queue SQ is information indicating that the tail of the submission queue SQ has been changed.

In an example, when the host inputs a command to the submission queue SQ, the host may transmit the tail doorbell information for the submission queue SQ to the memory system 100 in order to inform the memory system 100 that the tail of the submission queue SQ has changed. In this case, the tail doorbell information on the submission queue SQ may include a value of the changed tail of the submission queue SQ.

The memory system 100 may check the tail doorbell information of the submission queue SQ to confirm that the tail of the submission queue SQ has changed. Further, the memory system 100 may check which command to fetch from the corresponding submission queue SQ based on the tail of the submission queue SQ.

The head doorbell information for the completion queue CQ is information indicating that the head of the completion queue CQ has been changed.

For example, when the memory system 100 processes a command and then inputs the execution result (e.g., success/failure) of the command to the completion queue CQ, the head of the completion queue CQ may be changed. At this time, the host may transmit head doorbell information for the completion queue CQ to the memory system 100 in order to inform the memory system 100 that the head of the completion queue CQ has changed. In this case, the head doorbell information for the completion queue CQ may include a value of the changed head of the completion queue CQ.

The memory system 100 may check the head doorbell information of the completion queue CQ to confirm that the head of the corresponding completion queue CQ has been changed. Further, the memory system 100 may check whether the host HOST has completed the command processing based on the head of the corresponding completion queue CQ.

As describe above, in embodiments of the present disclosure, the memory system 100 stores and manages tail doorbell information for the submission queue SQ and head doorbell information for the completion queue CQ in a buffer memory BUF_MEM. The reason is as follows.

In general, the memory system 100 stores tail doorbell information for the submission queue SQ and head doorbell information for the completion queue CQ in a fixed size register.

In this case, the number and size of registers are fixed at the design stage. Therefore, it is impossible for the memory system 100 to dynamically change the interval of the register storing doorbell information (i.e., the tail doorbell information for the submission queue SQ and the head doorbell information for the completion queue CQ) without changing the design of the memory system 100.

In addition, in the case that a setting value of the interval of the register storing doorbell information is greater than or equal to a specific value, the size of the hardware logic to implement the register may exceed the allowable range of the memory system 100. In this case, in order to implement the register for storing doorbell information within an allowable range by the memory system 100, the number of available submission queues SQ and completion queues CQ may be limited.

However, if the memory system 100 stores the doorbell information (i.e. the tail doorbell information for the submission queue SQ and the head doorbell information for the completion queue CQ) in the buffer memory BUF_MEM rather than the register, the memory system 100 may dynamically change the location where doorbell information is stored regardless of the interval of registers storing doorbell information. This is because the storage capacity of the buffer memory BUF_MEM is much larger than the storage capacity of the register. Therefore, there is no issue that the number of available submission queues SQ and completion queue CQ is limited.

In addition, the memory system 100 may easily move the location where the doorbell information is stored on the buffer memory BUF_MEM by changing the address value. Therefore, the memory system 100 may more efficiently manage resources for storing doorbell information.

Hereinafter, the change process of the submission queue SQ, tail doorbell information for the submission queue SQ, the completion queue CQ and the head doorbell information for the completion queue CQ during the operation of the host and the memory system 100 will be described.

Figure 5:
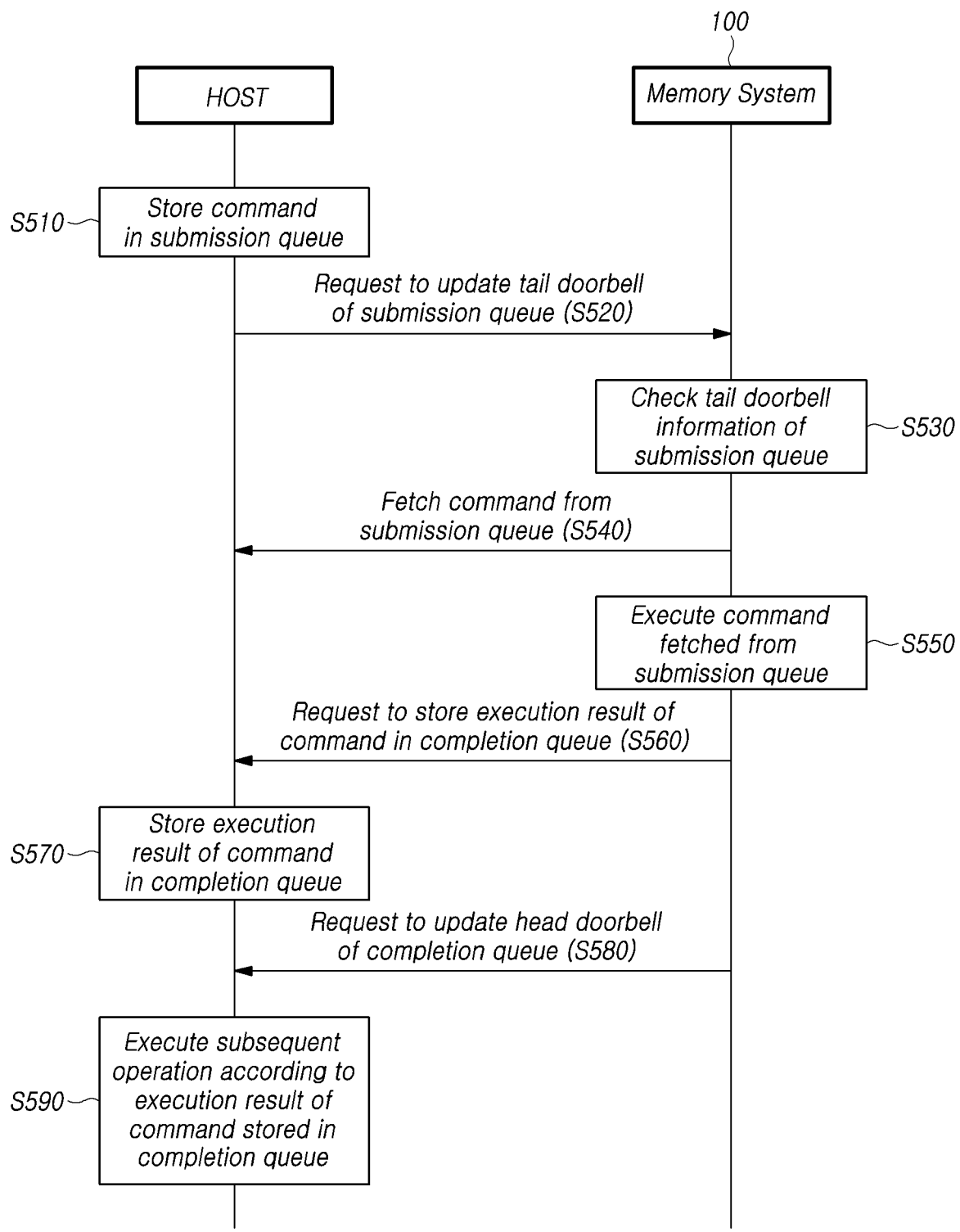
FIG. 5 is a sequence diagram illustrating an example of operations of a memory system and a host according to embodiments of the present disclosure.

FIG. 5 is a sequence diagram illustrating an example of operations of a memory system 100 and a host HOST according to embodiments of the present disclosure.

Referring to FIG. 5, the host HOST first may store a command in a submission queue SQ (S510). Next, the host HOST may request the memory system 100 to update tail doorbell information of the submission queue SQ (S520).

The memory system 100 may check the updated tail doorbell information of the submission queue SQ (S530). Further, the memory system 100 may fetch the command stored in the submission queue SQ from the submission queue SQ (S540).

In addition, the memory system 100 may execute the command fetched from the submission queue SQ (S550). Further, the memory system 100 may request the host to store the execution result (e.g., success/failure) of the command in the completion queue CQ (S560).

The host HOST may check the request of the memory system 100 and store the execution result of the corresponding command in the completion queue CQ (S570). The memory system 100 may request the host to update the head doorbell information of the completion queue CQ (S580).

In addition, the host HOST may execute a subsequent operation according to the execution result of the command stored in the completion queue CQ (S590).

For example, in the case that a corresponding command is successfully executed, the host HOST may store a subsequent command in the submission queue SQ so that the memory system 100 can execute the subsequent command. In another example, in the case that an operation of executing a corresponding command fails, the host HOST may store the corresponding command in the submission queue SQ again so that the memory system 100 can re-execute the corresponding command.

Hereinafter, an operation of the memory system 100 of accessing the tail doorbell information of the submission queue SQ or the head doorbell information of the completion queue CQ stored in BUF_MEM, in the case that the host requests to update the tail doorbell information of the submission queue SQ or the head doorbell information of the completion queue CQ, will be described.

Figure 6:
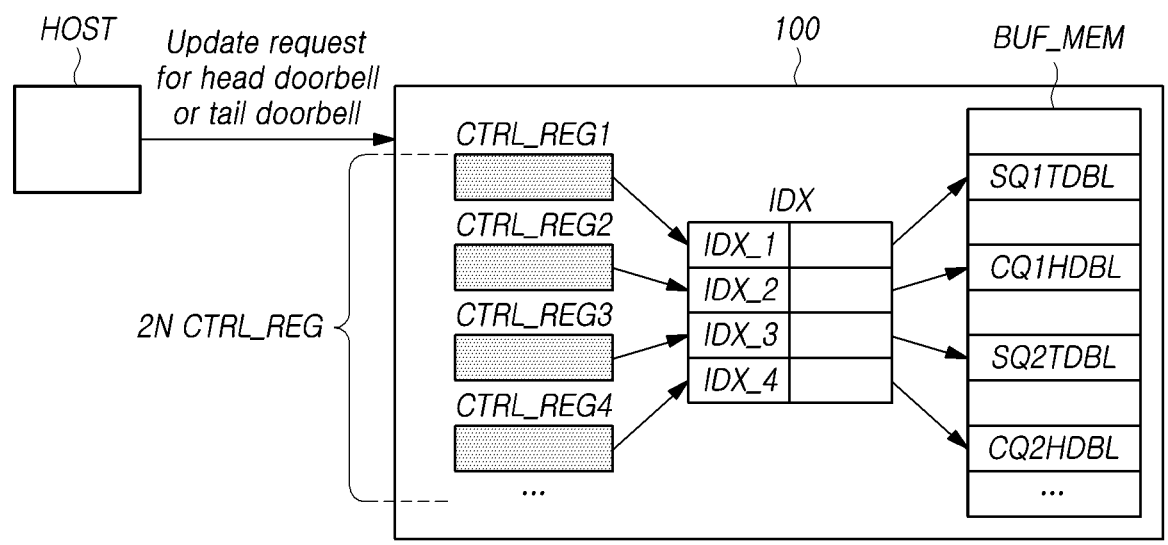
FIG. 6 is a diagram illustrating an example in which a memory system according to embodiments of the present disclosure accesses head doorbell information or tail doorbell information stored in a buffer memory.

FIG. 6 is a diagram illustrating an example in which a memory system 100 according to embodiments of the present disclosure accesses head doorbell information or tail doorbell information stored in a buffer memory BUF_MEM.

Referring to FIG. 6, a memory system 100 may further include 2N control registers CTRL_REG. The control register CTRL_REG may be included in the processor 124 illustrated in FIG. 1 as an example.

The control register CTRL_REG may indicate the position of an index IDX for searching for tail doorbell information or head doorbell information in the buffer memory BUF_MEM. The memory system 100 may check whether the host has requested the update of tail doorbell information of one of the N submission queues SQ1 to SQN in FIG. 4, or whether the host has requested the update of head doorbell information of one of the N completion queues CQ1 to CQN in FIG. 4, and then may refer one of the 2N control registers CTRL_REG.

In this case, each control register CTRL_REG does not store the entire tail doorbell information or the entire head doorbell information, but indicates only the position of the index IDX for searching for tail doorbell information or head doorbell information. Therefore, regardless of the size of the tail doorbell information or the head doorbell information, the size of the control register CTRL_REG corresponding to one doorbell information (tail doorbell information or head doorbell information) may be a constant value (e.g. 4 bytes).

In FIG. 6, a first control register CTRL_REG1 among the 2N control registers CTRL_REG may indicate the position of a first index IDX_1. The first index IDX_1 may include information for searching in the buffer memory BUF_MEM for first tail doorbell information SQ1TDBL, which is tail doorbell information for a first submission queue SQ1 among the N submission queues SQ1 to SQN.

In addition, a second control register CTRL_REG2 may indicate the position of a second index IDX_2. The second index IDX_2 may include information for searching in the buffer memory BUF_MEM for first head doorbell information CQ1HDBL, which is head doorbell information for a first completion queue CQ1 among the N completion queues CQ1 to CQN.

Further, a third control register CTRL_REG3 may indicate the position of a third index IDX_3. The third index IDX_3 may include information for searching in the buffer memory BUF_MEM for second tail doorbell information SQ2TDBL, which is tail doorbell information for a second submission queue SQ2 among the N submission queues SQ1 to SQN.

In addition, a fourth control register CTRL_REG4 may indicate the position of a fourth index IDX_4. The fourth index IDX_4 may include information for searching in the buffer memory BUF_MEM for second head doorbell information CQ2HDBL, which is head doorbell information for a second completion queue CQ2 among the N completion queues CQ1 to CQN.

The memory system 100 may manage the index IDX, as an example, through a separate address translation unit (ATU), or through a table including one or more pairs of address values of the control register CTRL_REG and the buffer memory BUF_MEM. The address translation unit (ATU) may receive a source address and output a result address corresponding to the source address.

Figure 7:
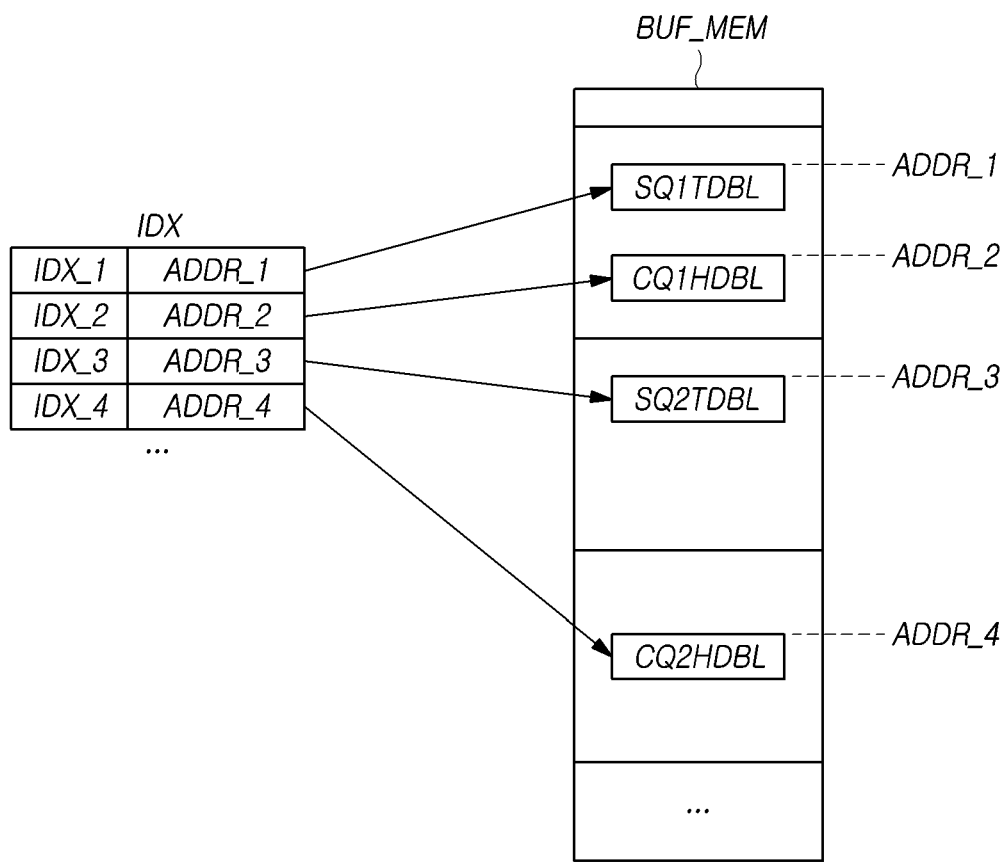
FIG. 7 is a diagram illustrating an example of the structure of the index of FIG. 6, according to an embodiment of the present disclosure.

FIG. 7 is a diagram illustrating an example of the structure of the index IDX of FIG. 6, according to embodiments of the present disclosure.

Referring to FIG. 7, the index IDX may indicate an address in which tail doorbell information or head doorbell information is stored in the buffer memory BUF_MEM. The memory system 100 may check the value of the index IDX, and may determine the address on the buffer memory BUF_MEM in which tail doorbell information of the submission queue SQ or head doorbell information of the completion queue CQ to be searched is stored.

In FIG. 7, the first index IDX_1 indicates that the address of the tail doorbell information SQ1TDBL for the first submission queue SQ1 is the first address ADDR_1.

In addition, the second index IDX_2 indicates that the address of the head doorbell information CQ1HDBL for the first completion queue CQ1 is the second address ADDR_2.

Further, the third index IDX_3 indicates that the address of the tail doorbell information SQ2TDBL for the second submission queue SQ2 is the third address ADDR_3.

In addition, the fourth index IDX_4 indicates that the address of the head doorbell information CQ2HDBL for the second completion queue CQ2 is the fourth address ADDR_4.

In FIG. 7, the case in which the values of the first address ADDR_1, the second address ADDR_2, the third address ADDR_3, and the fourth address ADDR_4 are sequentially increased, but there is no limit to the pattern of the address value on the buffer memory BUF_MEM indicated by the index IDX, has been illustrated.

Figure 8:
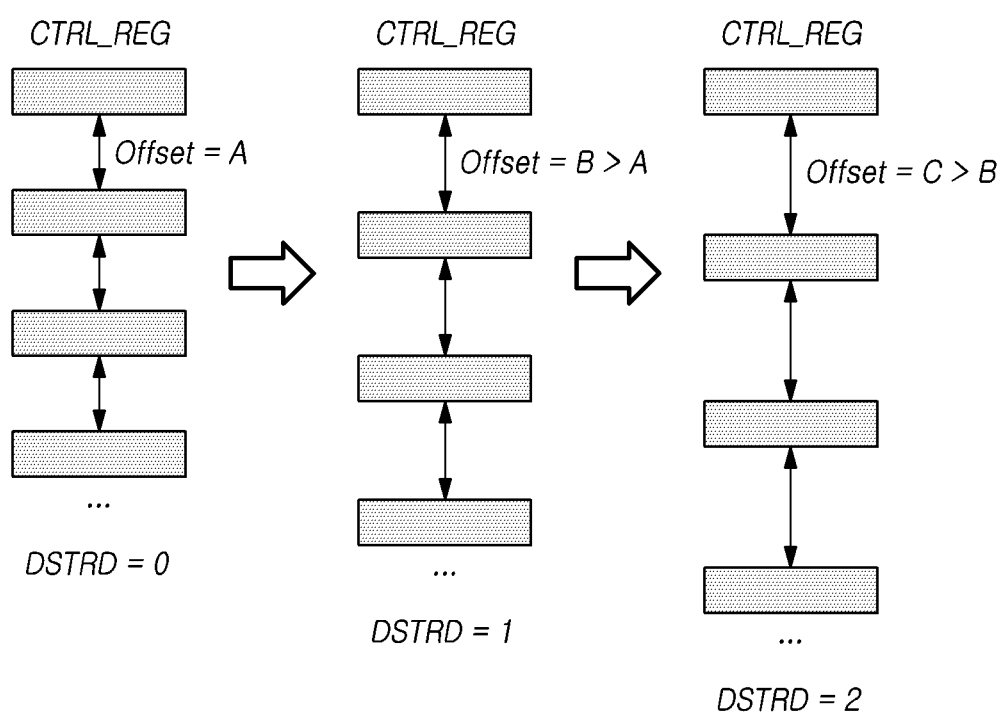
FIG. 8 is a diagram illustrating an example of an offset between control registers according to embodiments of the present disclosure.

FIG. 8 is a diagram illustrating an example of an offset between control registers CTRL_REG according to embodiments of the present disclosure.

Referring to FIG. 8, an offset between two adjacent control registers CTRL_REG may be determined according to a preset stride value DSTRD. The offset between the two adjacent control registers CTRL_REG means a difference in the address of the two adjacent control registers CTRL_REG. When two control registers CTRL_REG are adjacent to each other, it means that the addresses of the two control registers CTRL_REG are adjacent to each other compared to other control registers.

For example, as the stride value DSTRD increases, the offset between the two adjacent control registers CTRL_REG may also increase. The offset between the two adjacent control registers CTRL_REG may be $2^{(2+DSTRD)}$ bytes.

In FIG. 8, in the case that the stride value DSTRD is 0, the offset between the two adjacent control registers CTRL_REG is A.

In the case that the stride value DSTRD is 1, the offset B between the two adjacent control registers CTRL_REG is greater than A. If the stride value DSTRD is 2, the offset C between the two adjacent control registers CTRL_REG is greater than B.

Accordingly, in the case that the offset between the two adjacent control registers CTRL_REG increases according to the stride value DSTRD, the register located between the two adjacent control registers CTRL_REG may be used for other purposes instead of for indicating doorbell information.

Figure 9:
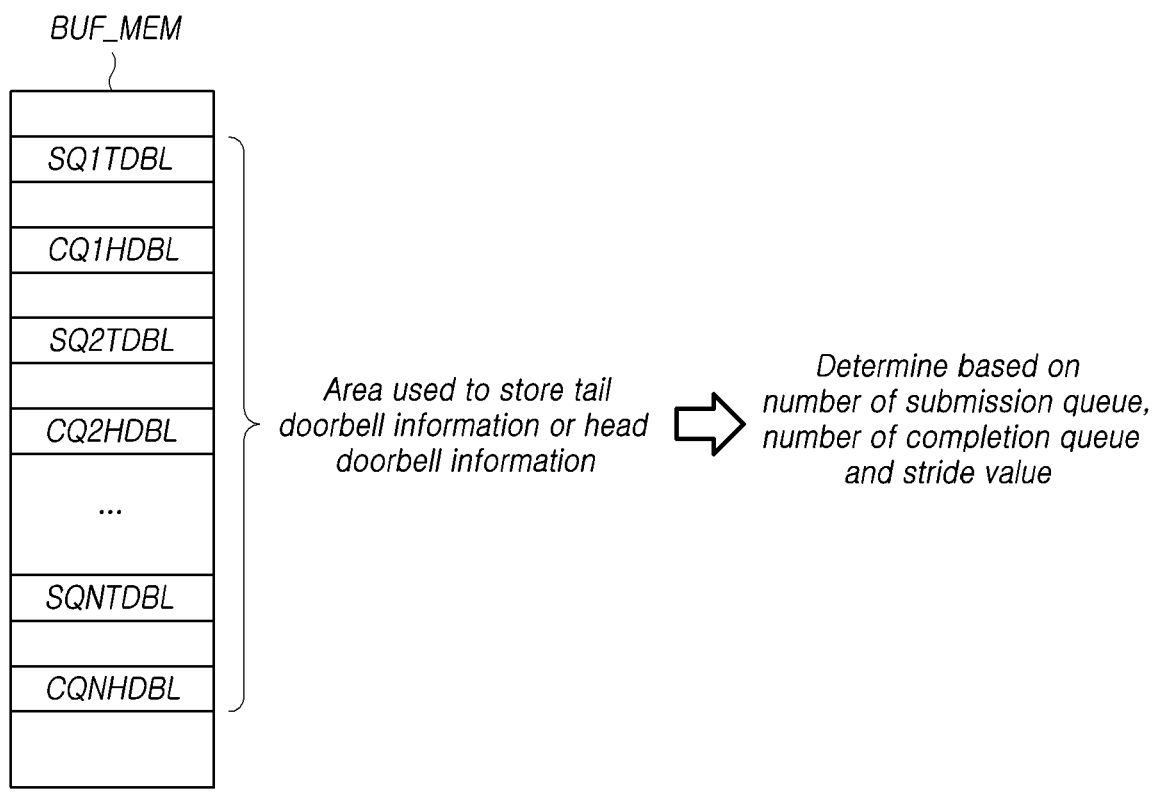
FIG. 9 is a diagram illustrating an example of an area used to store head doorbell information or tail doorbell information in a buffer memory according to embodiments of the present disclosure.

FIG. 9 is a diagram illustrating an example of an area used to store head doorbell information or tail doorbell information in a buffer memory BUF_MEM according to embodiments of the present disclosure.

Referring to FIG. 9, the memory system 100 may set the size of an area used to store tail doorbell information for the submission queue SQ and head doorbell information for the completion queue CQ in the buffer memory BUF_MEM based on the number of submission queues SQ, the number of completion queues CQ and stride values DSTRD.

In an example, the number of submission queues and the number of completion queues are N, respectively, and the stride value DSTRD is D, the memory system 100 may set the size of an area used to store tail doorbell information for the submission queue SQ and head doorbell information for the completion queue CQ in the buffer memory BUF_MEM to $(2N*(2^{(2+D)}))$ bytes.

In this case, the area used to store tail doorbell information for the submission queue SQ and head doorbell information for the completion queue CQ does not necessarily have to be a continuous area, the area may be composed of one or more discontinuous sub-areas. However, in this case, the size of the sub-area is a multiple of the set unit (e.g., 4 KB).

Figure 10:
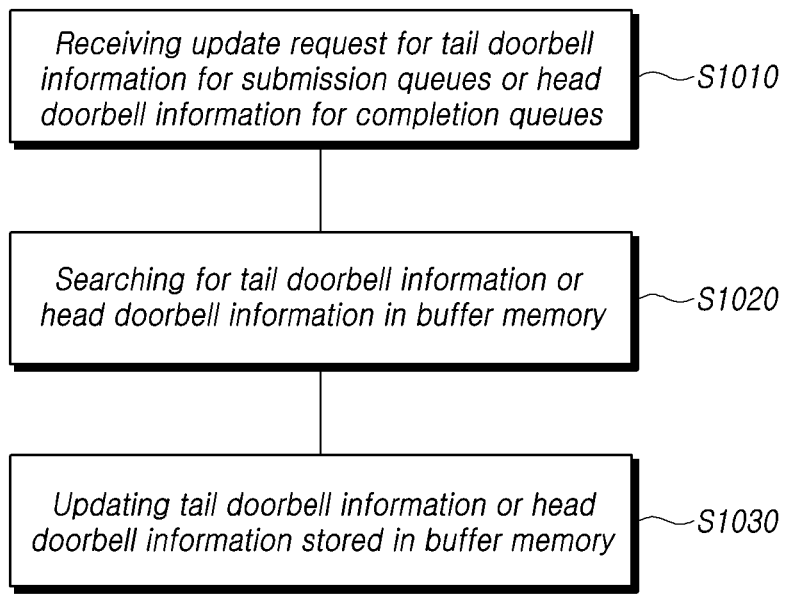
FIG. 10 is a flowchart illustrating an operating method of a memory system according to embodiments of the present disclosure.

FIG. 10 is a flowchart illustrating an operating method of a memory system 100 according to embodiments of the present disclosure.

Referring to FIG. 10, the operating method of the memory system 100 may include receiving, from a host HOST, an update request for tail doorbell information for one of N (where N is a natural number) submission queues SQ or head doorbell information for one of N completion queues CQ (S1010). Each of the N submission queues SQ can store a command fetched from the host HOST, and each of the N completion queues CQ can store an execution result of the command fetched from the host HOST.

In addition, the operating method of the memory system 100 may include searching for, in a buffer memory BUF_MEM for storing the tail doorbell information or the head doorbell information, an address in which the tail doorbell information or the head doorbell information is stored (S1020).

In addition, the operating method of the memory system 100 may include updating the tail doorbell information or the head doorbell information stored in the buffer memory BUF_MEM (S1030).

For example, the position of the index IDX for searching for tail doorbell information or head doorbell information may be indicated by one of 2N control registers CTRL_REG included in the memory system 100.

The index IDX may indicate the address in which tail doorbell information or head doorbell information is stored on the buffer memory BUF_MEM.

An offset between the two adjacent control registers CTRL_REG may be determined according to a preset stride value DSTRD.

Moreover, the size of an area used to store tail doorbell information and head doorbell information in the buffer memory BUF_MEM may be set based on the number of submission queues SQ, the number of completion queues CQ and stride values DSTRD.

Figure 11:
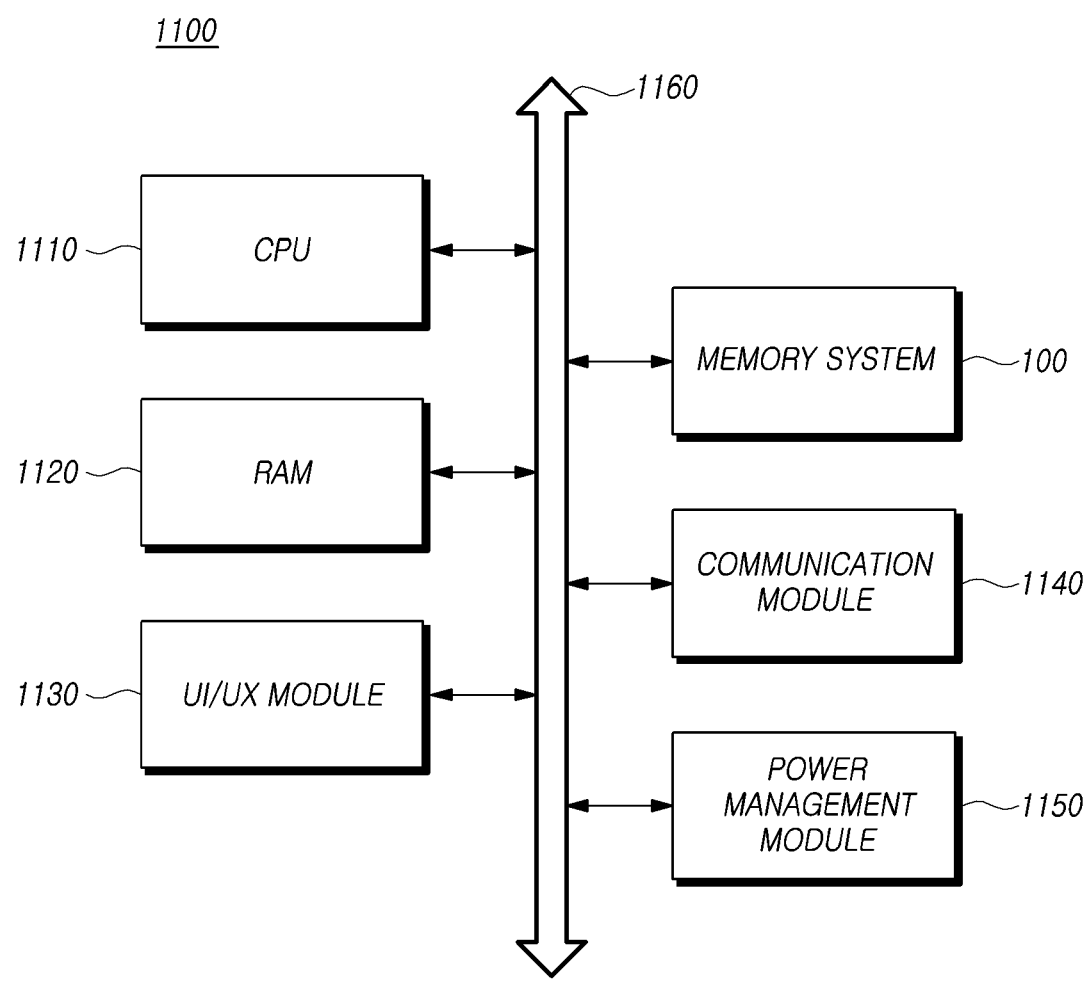
FIG. 11 is a diagram illustrating the configuration of a computing system according to some embodiments of the disclosed technology.

FIG. 11 is a diagram illustrating the configuration of a computing system 1100 according to an embodiment of the disclosed technology.

Referring to FIG. 11, the computing system 1100 based on an embodiment of the disclosed technology may include: a memory system 100 electrically connected to a system bus 1160; a central processing unit (CPU) 1110 configured to control the overall operation of the computing system 1100; a random access memory (RAM) 1120 configured to store data and information related to operations of the computing system 1100; a user interface/user experience (UI/UX) module 1130 configured to provide the user with a user environment; a communication module 1140 configured to communicate with an external device as a wired and/or wireless type; and a power management module 1150 configured to manage power used by the computing system 1100.

The computing system 1100 may be a personal computer (PC) or may include a mobile terminal such as a smartphone, a tablet or various electronic devices.

The computing system 1100 may further include a battery for supplying an operating voltage, and may further include an application chipset, a graphic-related module, a camera image processor, and a dynamic random access memory (DRAM). Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A memory system capable of performing a preset command queue-based interface operation with a host, the memory system comprising:
a buffer memory for storing tail doorbell information for N submission queues capable of storing a command fetched from the host, or head doorbell information for N completion queues capable of storing an execution result of the command; and
2N control registers, wherein each control register indicates a position of an index for searching for the tail doorbell information or the head doorbell information,
wherein the index indicates an address in which the tail doorbell information or the head doorbell information is stored in the buffer memory,
wherein an area used for storing the tail doorbell information and the head doorbell information in the buffer memory is composed of one or more discontinuous sub-areas, and
wherein N is a natural number.

2. The memory system of claim 1, wherein an offset between the two adjacent control registers is determined according to a set stride value.

3. The memory system of claim 2, wherein a size of an area used for storing the tail doorbell information or the head doorbell information in the buffer memory is set based on the number of the submission queues, the number of the completion queues, and the stride value.

4. An operating method of a memory system capable of performing a preset command queue-based interface operation with a host, the operating method comprising:
receiving, from the host, an update request for tail doorbell information for one of N submission queues capable of storing a command fetched from the host, or head doorbell information for one of N completion queues capable of storing an execution result of the command;
searching for, in a buffer memory for storing the tail doorbell information or the head doorbell information, an address in which the tail doorbell information or the head doorbell information is stored in the buffer memory; and
updating the tail doorbell information or the head doorbell information stored in the buffer memory,
wherein a position of an index for searching for the tail doorbell information or the head doorbell information is indicated by one of 2N control registers included in the memory system,
wherein the index indicates the address in which the tail doorbell information or the head doorbell information is stored in the buffer memory,
wherein an area used for storing the tail doorbell information and the head doorbell information in the buffer memory is composed of one or more discontinuous sub-areas, and
wherein N is a natural number.

5. The operating method of claim 4, wherein an offset between the two adjacent control registers is determined according to a set stride value.

6. The operating method of claim 5, wherein a size of an area used for storing the tail doorbell information or the head doorbell information in the buffer memory is set based on the number of the submission queues, the number of the completion queues, and the stride value.

7. A system comprising:
a memory system including a memory device; and
a host including a plurality of queues associated with at least one command for the memory device,
wherein the memory system further includes:
a buffer memory configured to store doorbell information with submission and completion of the command; and
one or more control registers configured to store information regarding a position of the buffer memory in which the doorbell information is stored, wherein each of the control registers indicates a position of an index for searching for the doorbell information with submission and completion of the command, wherein the index indicates an address in which the doorbell information with submission and completion of the command is stored in the buffer memory, and wherein an area used for storing the doorbell information with submission and completion of the command in the buffer memory is composed of one or more discontinuous sub-areas.

* * * * *